(12) United States Patent
Tallon et al.

(10) Patent No.: US 6,797,793 B1
(45) Date of Patent: Sep. 28, 2004

(54) PROCESS FOR MAKING VINYL ETHER POLYMERS

(75) Inventors: Michael A. Tallon, Aberdeen, NJ (US); John Mc Kittrick, Jersey City, NJ (US); Stephen L. Kopolow, Plainsboro, NJ (US); James Dougherty, Kinnelon, NJ (US); David K. Hood, Basking Ridge, NJ (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 10/642,029

(22) Filed: Aug. 14, 2003

(51) Int. Cl.[7] .................................................. C08F 2/00
(52) U.S. Cl. ........................ 526/233; 526/130; 526/332
(58) Field of Search ................................ 526/130, 233, 526/332

(56) References Cited

U.S. PATENT DOCUMENTS

| 3,228,923 | A | * | 1/1966 | Cherry et al. ................ 526/194 |
| 3,365,433 | A | * | 1/1968 | Sorkin et al. ................ 526/194 |
| 3,461,075 | A | * | 8/1969 | Manson et al. ......... 252/301.36 |
| 3,819,596 | A | * | 6/1974 | Gross et al. ................. 526/194 |
| 5,055,536 | A | * | 10/1991 | Dubois ........................ 526/194 |
| 5,691,430 | A | * | 11/1997 | Dougherty et al. .......... 526/103 |
| 6,235,859 | B1 | * | 5/2001 | Naka et al. .................. 526/332 |

* cited by examiner

*Primary Examiner*—Helen L. Pezzuto
(74) *Attorney, Agent, or Firm*—Walter Katz; William J. Davis

(57) ABSTRACT

A process for producing a polymer of a vinyl ether monomer by contacting the monomer with phosphorous pentoxide as polymerization initiator.

10 Claims, No Drawings

PROCESS FOR MAKING VINYL ETHER POLYMERS

BACKGROUND OF THE INVENTION

1. Field of the Invention

This invention relates to a process for polymerizing vinyl ethers, and, more particularly, to a new and improved initiator for effecting such polymerization in an efficient manner.

2. Description of the Prior Art

Polymers of vinyl ethers and catalytic processes to prepare these polymers have been described in the art. See U.S. Pat. Nos. 3,228,923; 3,365,433; 3,394,116; 3,461,075; 3,819,596; 5,055,536; 5,691,430 and 6,235,859. Various heterogeneous initiators or catalysts such as molecular sieves and zeolites have been used as the initiator system. Vinyl ethers also have been polymerized in the presence of strong Lewis acids such as boron trifluoride. Recently, J. Dougherty et al., in U.S. Pat. No. 5,691,430, disclosed a useful heterogeneous initiator system for polymerizing vinyl ether monomers. The catalyst was sea sand which contained predominately silicon dioxide and one or more metallic oxides. The vinyl ether homopolymer obtained had an advantageous weight average molecular weight and polydispersity.

U.S. Pat. No. 6,235,859 also described a process for polymerization of a vinyl ether monomer which employed an acid-treated acid clay mineral as catalyst. This acid treatment was intended to give the acid clay mineral a porous structure and a large surface area, which properties were considered advantageous for rapid polymerization of the vinyl ether monomer.

Accordingly, it is an object of this invention to provide a process for making vinyl ether polymers in a substantially quantitative yield.

A specific object herein is to provide such a process using an initiator which enables the polymerization to proceed at a predetermined reaction rate under advantageous temperature conditions.

These and other objects of the invention will be made apparent from the following description of the invention.

SUMMARY OF THE INVENTION

What is described herein is a new and improved process for producing a polymer of a vinyl ether monomer which comprises contacting the monomer with phosphorous pentoxide as the polymerization initiator.

Suitably, the phosphorous pentoxide initiator is present in an amount of at least 0.1 ppm, preferably 0.2–40 ppm, based on the weight of the vinyl ether monomer.

The phosphorous pentoxide initiator can be used neat, or with diluent, such as polyethylene, on or in a substrate, or contained in occurring mineral ore or clay, which ordinarily usually includes silicon dioxide and one or more metallic oxides such as aluminum oxide, magnesium oxide, ferric oxide or titanium oxide. The phosphorous pentoxide suitably is present in the ore in an amount of at least 100 ppm, preferably 200–4000 ppm. At least 10 mg of ore is used/g vinyl ether monomer for the polymerization. Suitably, such ores have a desirable porosity so that the ore is accessible to the monomer, suitably about 0.9 cc/g.

In this invention, polymerization of the vinyl ether monomer is substantially complete within 16 hours at a temperature ranging from room temperature to 55° C. in a batch process; preferably within 2–12 hours at a temperature of 35–50° C.

DETAILED DESCRIPTION OF THE INVENTION

The process of this invention is carried out by contacting a vinyl ether monomer having the formula:

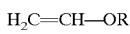

where R is alkyl, cycloalkyl or alkyl substituted cycloalkyl, aromatic or alkyl substituted aromatic; containing 1–20 carbon atoms, with phosphorous pentoxide as the a polymerization initiator.

Suitable vinyl ether monomers for use herein include lower linear and cyclic alkyl vinyl ethers such as methyl vinyl ether, ethyl vinyl ether, propyl vinyl ether, butyl vinyl ether, cyclohexyl divinyl ether, cyclohexyl vinyl ether and higher alkyl vinyl ethers such as dodecyl vinyl ether. Copolymers of different vinyl ethers or copolymers with one or more vinyl ethers and one or more other comonomers also may be prepared by the process of the invention. Accordingly, copolymers of different vinyl ethers and of vinyl ethers and other comonomers may be of block, random, or tapered sequences and may be of radial, linear or branched structures.

The product of the invention preferably is a substantially colorless vinyl ether polymer whose physical properties can be controlled by the particular vinyl ether monomer selected, and the reaction conditions used including the amount of the initiator used, and the reaction time and temperature.

These reaction parameters also will affect the polymerization rate. Under such selected conditions, homopolymerization is effected within a suitable reaction period without affecting the catalyst itself. Generally a residence time ranging from less than 16 hours, preferably about 2 to 12 hours, at room temperature to 55° C., preferably 35–50° C., is sufficient to provide substantially complete polymerization of the vinyl ether monomer.

Suitably, the phosphorous pentoxide initiator is present in an amount of at least 0.1 ppm, preferably 0.2–40 ppm, based on the weight of the vinyl ether monomer.

The phosphorous pentoxide initiator can be used neat, or with diluent, such as polyethylene, on or in a substrate, or contained in occurrng mineral ore or clay, which ordinarily usually includes silicon dioxide and one or more metallic oxides such as aluminum oxide, magnesium oxide, ferric oxide or titanium oxide. The phosphorous pentoxide suitably is present in the ore in an amount of at least 100 ppm, preferably 200–4000 ppm. At least 10 mg of ore is used/g vinyl ether monomer for the polymerization. Suitably, such ores have a desirable prorosity so that the ore is accessible to the monomer, suitably about 0.9 cc/g.

In this invention, polymerization of the vinyl ether monomer is substantially complete within 16 hours at a temperature ranging from room temperature to 55° C. in a batch process; preferably within 2–12 hours at a temperature of 35–50° C.

In general, the polymerization of this invention may be carried out in batch, continuous or semi-continuous operations.

The invention will now be described in more detail by reference to the following examples.

BATCH PROCESSING

EXAMPLE 1

Invention Examples

Butyl vinyl ether monomer, 5 g, was mixed at room temperature with phosphorous pentoxide initiator, 1.0 mg, thus providing 0.2 mg of initiator per g of monomer. A rapid polymerization occurred yielding a dark viscous homopolymer of butyl vinyl ether.

EXAMPLE 2

Butyl vinyl ether, 5 g, was mixed at room temperature with pellets of Attapulgite mineral ore, 50 mg. The phosphorous pentoxide content in the ore was 3600 ppm per g of ore. The ore had a porosity of 0.86 cc/g. A rapid exothermic polymerization occurred yielding a clear, viscous polymeric product. The pellets were removed from the clear polymer by filtration. The total reaction time was 5 minutes.

EXAMPLE 3

Butyl vinyl ether, 5 g, was mixed at room temperature with pellets of montmorillonite mineral ore, 50 mg, having a phosphorous pentoxide content therein of 120 ppm and a porosity of 0.9 cc/g. A moderate polymerization reaction occurred. Upon heating the reactants to 35° C., the polymerization rate was increased. A clear, viscous homopolymer product was obtained. The spent montmorillonite pellets were removed from the polymeric product by filtration. The total reaction time was 26 minutes.

EXAMPLE 4

Butyl vinyl ether, 5 g, was mixed at room temperature with bauxitic kaolin, 50 mg, having a phosphorous pentoxide content of 263 ppm in the ore and a porosity of 0.9 cc/g. No polymerization was visible. Upon heating to 35° C., a slow polymerization occurred to yield a clear, viscous polymer product. The total reaction time was 2 hours.

COMPARATIVE EXAMPLE

EXAMPLE 5

Butyl vinyl ether, 5 g, was mixed at room temperature with calcined kaolin, having 50 mg of a phosphorous pentoxide content of less than 1 ppm. The porosity of the ore was 0.04 cc/g. No reaction occurred. Heating the reactants to 35° C. for 12 hours, and then to 60° C. for an additional 12 hours, still did not produce any polymerization.

CONTINUOUS FEED CONDITIONS

EXAMPLE 6

A 12-inch long, 1.125 inch ID heat exchanger was charged with 50 g of the mineral ore of Example 2 contained in a mesh filter. The exchanger was heated to 40° C., and filled with EVE. Additional EVE was forced through the heat exchanger under a pressure of about 62 psig. A 50 ml forecut was removed and the following 150 ml was collected. After removing traces of unreacted monomer, a very light yellow viscous polymer was obtained. NMR analysis confirmed the formation of poly(ethylvinyl ether).

While the invention has been described with particular reference to certain embodiments thereof, it will be understood that changes and modifications may be made which are within the skill of the art. Accordingly, it is intended to be bound only by the following claims.

What is claimed is:

1. A process for producing a polymer of a vinyl ether monomer which comprises contacting said monomer with phosphorous pentoxide as polymerization initiator.

2. A process according to claim 1 wherein said vinyl ether monomer has the formula:

$$H_2C=CH-OR$$

wherein R is an alkyl, cycloalkyl or alkyl substituted cycloalkyl, aromatic or alkyl substituted aromatic and R contains 1 to 20 carbon atoms.

3. A process according to claim 1 wherein said phosphorous pentoxide is present in an amount of at least 0.1 ppm based on the weight of the vinyl ether monomer.

4. A process according to claim 1 wherein said amount is about 0.2–40 ppm.

5. A process according to claim 1 wherein said initiator is present neat, on or in a substrate, or in a mineral ore which includes silicon dioxide and one or more metallic oxides.

6. A process according to claim 5 wherein said phosphorous pentoxide is present in said ore in an amount of at least 100 ppm.

7. A process according to claim 6 wherein said amount is about 200–4000 ppm.

8. A process according to claim 7 wherein at least 10 mg of ore is used per g of vinyl ether.

9. A process according to claim 1 wherein polymerization is substantially complete within 16 hours at a temperature ranging from room temperature to 55° C. in a batch process.

10. A process according to claim 9 which is complete within 2–12 hours at 35–50° C.

* * * * *